(12) United States Patent
Ulrich

(10) Patent No.: US 9,169,063 B2
(45) Date of Patent: Oct. 27, 2015

(54) CORNER BOARDS, CONTAINER ASSEMBLIES INCLUDING THE SAME, AND METHODS OF MAKING AND USING THE SAME

(71) Applicant: Clyde Ulrich, Kingsburg, CA (US)

(72) Inventor: Clyde Ulrich, Kingsburg, CA (US)

(73) Assignee: Sierra Packaging Solutions, Kingsburg, CA (US)

( * ) Notice: Subject to any disclaimer, the term of this patent is extended or adjusted under 35 U.S.C. 154(b) by 101 days.

(21) Appl. No.: 13/904,967

(22) Filed: May 29, 2013

(65) Prior Publication Data

US 2013/0320030 A1 Dec. 5, 2013

Related U.S. Application Data

(60) Provisional application No. 61/652,795, filed on May 29, 2012, provisional application No. 61/666,682, filed on Jun. 29, 2012.

(51) Int. Cl.
*B65D 90/08* (2006.01)
*B23P 19/00* (2006.01)
*B65B 13/00* (2006.01)
*B65D 81/05* (2006.01)

(52) U.S. Cl.
CPC .............. *B65D 90/08* (2013.01); *B23P 19/00* (2013.01); *B65B 13/00* (2013.01); *B65D 81/056* (2013.01); *B65D 2581/053* (2013.01); *Y10T 29/49616* (2015.01); *Y10T 29/5116* (2015.01); *Y10T 29/53* (2015.01)

(58) Field of Classification Search
CPC ............... B65D 90/08; B65D 81/056; B65D 2581/053; B65D 13/00; B65D 13/181
See application file for complete search history.

(56) References Cited

U.S. PATENT DOCUMENTS

| | | | | |
|---|---|---|---|---|
| 3,580,469 | A | * | 5/1971 | Reese ............................ 206/521 |
| 3,613,985 | A | * | 10/1971 | Goodsite ........................ 206/586 |
| 3,695,421 | A | * | 10/1972 | Wood ............................. 206/523 |
| 3,804,357 | A | * | 4/1974 | Robinett et al. ............... 248/553 |
| 3,963,125 | A | * | 6/1976 | Baggott ..................... 211/126.15 |
| 3,982,682 | A | * | 9/1976 | Fremion ......................... 206/586 |
| 4,399,915 | A | * | 8/1983 | Sorenson ....................... 206/586 |
| 5,758,470 | A | | 6/1998 | Lancaster |
| 5,813,537 | A | | 9/1998 | DeReu et al. |
| 6,012,587 | A | | 1/2000 | McCullough |
| 8,046,975 | B1 | | 11/2011 | Bison |
| 8,833,573 | B2 | * | 9/2014 | Tomaszewski et al. .. 211/126.12 |
| 2011/0180450 | A1 | | 7/2011 | Hainer |
| 2011/0278198 | A1 | | 11/2011 | Hazell |

OTHER PUBLICATIONS

International Search Report and Written Opinion dated Dec. 3, 2013, International Application No. PCT/US2013/046887, International Searching Authority, United States.

* cited by examiner

*Primary Examiner* — Gary Elkins
(74) *Attorney, Agent, or Firm* — Andrew D. Fortney; Central California IP Group, P.C.

(57) ABSTRACT

A corner board includes first and second sides, each including a board material; a bend between the first and second sides, joining first and second sides together; and a slit adjacent to a first end of the corner board, the slit completely crossing the bend and partially crossing the first and second sides. In addition, a method of manufacturing a corner board includes bending a board stock to form first and second sides of the corner board with an angle therebetween; cutting the board stock into fixed lengths, the bent and cut board stock forming the corner board; and forming a slit near a first end of the corner board. The present corner board may be advantageously rested or placed along a vertical edge of a container or stack of containers.

20 Claims, 6 Drawing Sheets

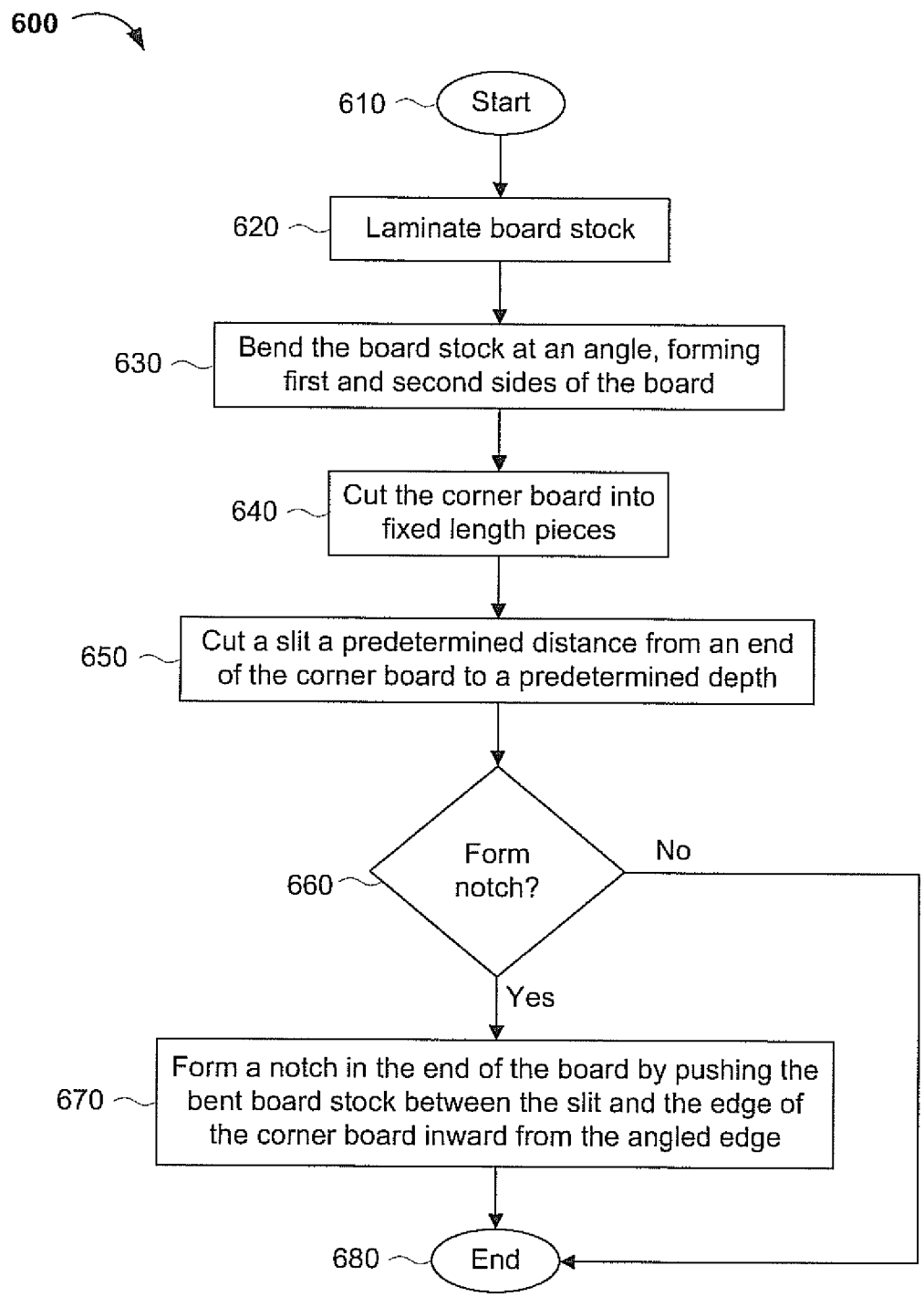

CORNER BOARDS, CONTAINER ASSEMBLIES INCLUDING THE SAME, AND METHODS OF MAKING AND USING THE SAME

CROSS REFERENCE TO RELATED APPLICATION

This application claims the benefit of U.S. Provisional Patent Application Nos. 61/652,795 and 61/666,682, filed on May 29, 2012 and Jun. 29, 2012, respectively, which are incorporated herein by reference as if fully set forth herein.

FIELD OF THE INVENTION

The present invention generally relates to the field of corner boards and methods of making and using the same. More specifically, embodiments of the present invention pertain to a corner board with a slit and/or a notch near an end, and methods of manufacturing and using such corner boards.

DISCUSSION OF THE BACKGROUND

Containers are used for holding and/or storing materials. Multiple containers can be stacked together as a single unit for various reasons, such as storage, transportation, or other operations involving multiple containers. For instance, multiple containers may be placed onto a pallet, for storage in a warehouse and/or loading onto a trailer for transportation (e.g., from a distribution warehouse to a store). When moving a pallet of containers by forklift, the forklift operator may inadvertently strike the edge of the pallet into a wall, shelving bracket, vehicle or even other container(s). Unexpected movement during transportation of the containers can also cause stacks to become unstable or fall, or otherwise become damaged. As a result, the manipulation of such containers or container stacks may result in damage to the exterior of the container(s) and/or the contents therein.

Corner boards may be placed on corners of container stacks to hold the stacks in place and/or mitigate damage to the containers. Conventionally, corner boards are attached to the exterior edges of the container stacks using staples or tape. However, this method for attaching corner boards is relatively time-consuming and requires additional materials to be used with the corner boards. Further, this method of attaching corner boards may create safety risks; for example, a person could become injured from the staple(s) that may protrude from the corner board when removing the stapled corner board(s) from the group of containers, or be cut when cutting the tape with a knife or box cutter. These methods for affixing corner boards may also damage the container(s) and/or their contents. For example, the staple used to attach the corner board may pierce the contents within the underlying container, or the tape may tear the exterior surface of the container, which frequently has a protective, moisture resistant or finished/decorative outer surface. Therefore, it is desirable to provide a corner board in which the corner board is easily placed on a container stack without the need to use additional means to affix the corner board to the container(s).

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

Embodiments of the present invention relate to a corner board that advantageously holds container stacks in place, eliminates and/or minimizes damage to the containers, and reduces or minimizes expenses due to damaged containers and/or container contents. In addition, the present corner board eliminates the need for costly corner board attachment materials and the risks associated with such attachment materials.

One aspect of the present invention relates to a corner board, comprising first and second sides, each including a board material; a bend between the first and second sides, joining first and second sides together; and a slit near or adjacent to a first end of the corner board, the slit completely crossing the bend and partially crossing the first and second sides. In various embodiments of the present invention, the corner board has a notch comprising a portion of the corner board between the slit and the first end of the corner board, the notch forming an opening along the slit and/or between the slit and the first end of the corner board. The notch (e.g., the portion of the corner board between the slit and the first end of the corner board) extends inward from the bend of the corner board.

Another aspect of the present invention relates to a method of manufacturing a corner board that includes bending a board stock to form first and second sides of the corner board, the first and second sides having an angle therebetween; cutting the board stock into fixed lengths, the bent and cut board stock forming the corner board; and forming a slit near a first end of the corner board. Further embodiments of the method include forming a notch at the first end of the corner board by pushing the portion of the bent board stock between the slit and the first end of the corner board inward from the angle, thereby forming an opening between the slit and the first end of the corner board.

A further aspect(s) of the present invention relates to an apparatus for forming a slit corner board that simultaneously cuts the board stock and forms the slit. In various embodiments of the apparatus, an attachment is configured to form the notch simultaneously with or immediately after cutting the board stock and/or forming the slit. An additional aspect of the present invention relates to a method of securing a plurality of stacked containers using the present corner board.

These and other advantages of the present invention will become readily apparent from the detailed description of various embodiments below.

BRIEF DESCRIPTION OF THE DRAWINGS

FIG. 6 is a flow chart of an exemplary method of manufacturing the corner board of FIG. 1, in accordance with an embodiment of the present invention.

DETAILED DESCRIPTION

Figure 1A:
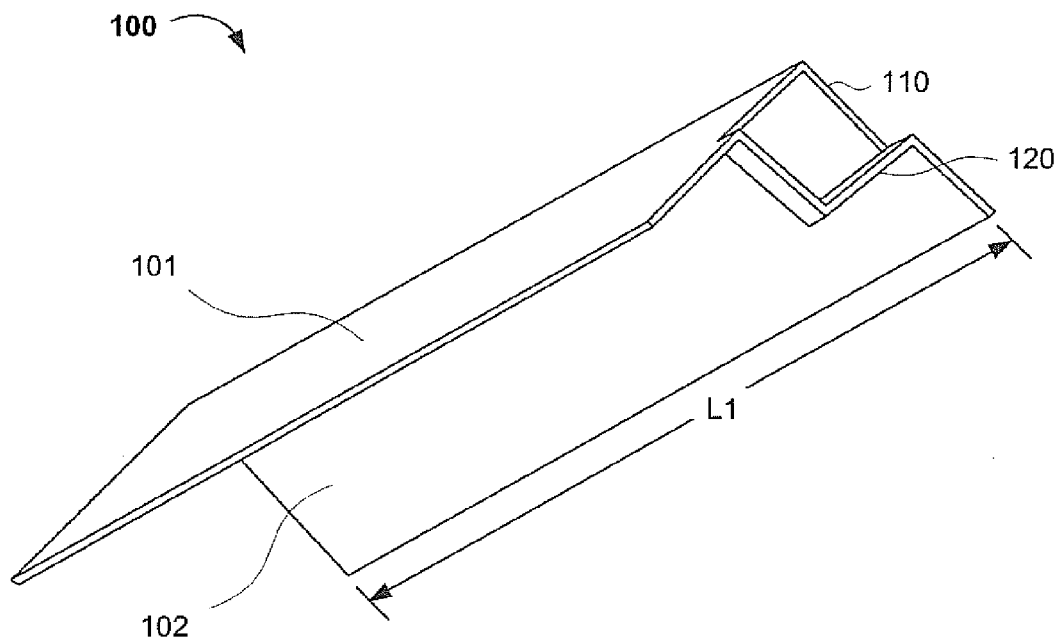
FIG. 1A is a perspective view of an exemplary corner board according to one embodiment of the present invention.

Reference will now be made in detail to various embodiments of the invention, examples of which are illustrated in the accompanying drawing(s). In order to achieve the objectives, technical solutions and advantages of the present invention more clearly, further details of the invention are described below with regard to the Figure(s). While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention as defined by the appended claims. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures, components, and attachment equipment have not been described in detail so as not to unnecessarily obscure aspects of the present invention. The embodiments described here are only used to explain, rather than limit, the invention.

In the context of this application, and for the sake of convenience and simplicity, the terms corner board, cornerboard, edge board, edgeboard, angle board, and angleboard may be used interchangeably herein, and use of one such term generally includes the others, unless indicated otherwise from the context of its use herein.

Thus, technical aspects of embodiments of the present invention will be more fully and clearly described in conjunction with the drawings in the following embodiments. It will be understood that the descriptions are not intended to limit the invention to these embodiments. Based on the described embodiments of the present invention, other embodiments can be obtained and/or derived by one skilled in the art without creative contribution or effort, and are considered within the scope of legal protection given to the present invention.

Furthermore, all characteristics, measures or processes disclosed in this document, except characteristics and/or processes that are mutually exclusive, can be combined in any manner and in any combination possible, either with each other or with structures in the prior art. Any characteristic disclosed in the present specification, claims, Abstract and Figures can be replaced by other equivalent characteristics or characteristics with similar objectives, purposes and/or functions, unless specified otherwise. Each characteristic is generally only an embodiment of the invention disclosed herein.

Embodiments of the present invention can advantageously provide a corner board that may be rested or placed along a vertical edge of a container or stack of containers, without the need for additional material or steps (e.g., staples or tape) for affixing the corner board to the container or stack. These and other advantages of the present invention will become readily apparent from the detailed description below.

Exemplary Corner Board(s)

Figure 2:
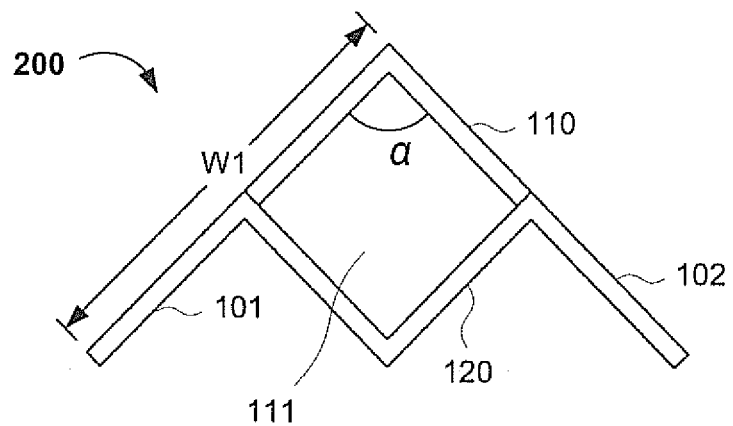
FIG. 2 is an end view of the corner board according to the embodiment of FIG. 1.

FIG. 1A illustrates an exemplary corner board 100 according to the present invention. In a first aspect of the present invention, the corner board 100 (which may also be known as a v-board, edge board, edge protector, corner post, ag board, protecting or protectant edge, angle board or other similar term) may comprise a stiff, angled piece of material. A portion of the corner board may have a slit (e.g., a cutout) 110 and a notch 120 at or near one end of the corner board 100. In various embodiments of the present invention, the slit 110 is located near or adjacent to one end of the board 100, and the notch 120 is between the slit 110 and end of the corner board. The notch 120 generally extends inward from the point of origin of the angle $\alpha$, as shown in FIG. 2.

Referring back to FIG. 1A, the corner board 100 may be formed from any material, such as paper, cardboard, pressboard, plastic, or any laminate or other combination thereof that has or can have a predetermined minimum stiffness. However, laminated paper, plastic or a combination thereof (such as commingled plastic) having a predetermined minimum stiffness is generally preferred. The listed materials comprise broad categories. For instance, "cardboard" may comprise any board material comprising paper and/or fiber, such as pressed and/or corrugated cardboard, fiberboard, paperboard, boxboard and/or containerboard. The corner board 100 may further comprise an overwrap (e.g., paper) and/or a laminate of cardboard and another material (such as plastic). In further embodiments, the overwrap may comprise either a full overwrap or a partial overwrap (e.g., with edges of the corner board being exposed). In some embodiments, the laminate may comprise one or more layers of paper and/or cardboard and one or more sheets or layers of plastic and/or wax.

In the embodiment of FIG. 1A, the corner board 100 comprises a plurality of sides. Generally, the corner board 100 has two sides 101, 102. Each side 101, 102 of the corner board 100 is generally rectangular. However, in other embodiments, the sides of the corner board can be square, triangular, trapezoidal, or any other suitable shape.

Figure 1B:
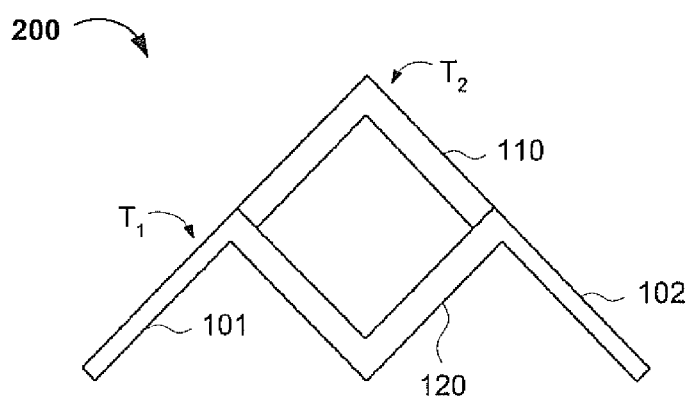
FIG. 1B is a perspective view of an exemplary corner board according to another embodiment of the present invention.

The corner board 100 can have any thickness suitable for protecting the edge of a container and/or group (e.g., stack) of containers. In some embodiments, the thickness of the corner board 100 may be the same thickness as the material used to create the corner board 100. In one embodiment, the corner board 100 may have a thickness of about 0.16 in. (0.4 cm). In other embodiments, the thickness can be in the range of 0.08 in. (0.2 cm) to 0.50 in. (1.3 cm), and can include a thickness of about 0.12 in. (0.3 cm), 0.2 in. (0.5 cm) or 0.25 in. (0.6 cm). Alternatively, the corner board 100 can have an inner thickness $T_2$ less than an outer thickness $T_1$ (see, e.g., U.S. Pat. No. 5,813,537, which discloses a so-called "apex" board), or alternatively, greater than the outer thickness $T_1$, as shown in FIG. 1B. For example, $T_2$ may be in the range of 0.12 in. to 0.50 in. (e.g., about 0.16 in.), and $T_1$ may be in the range of 0.08 in. to 0.375 in. (e.g., about 0.12 in.), or vice versa.

Referring back to FIG. 1A, a length L1 of the sides 101, 102 of the corner board 100 may be any length suitable for protecting the edge of a container and/or group of containers. In preferred embodiments, the length L1 of the sides 101, 102 of the corner board 100 is about 24 in. (60 cm) to about 90 in. (230 cm). However, it should be readily understood that the length L1 of the sides 101, 102 of the corner board 100 can be any value in the range, or more or less than such a range. In general, the thicker the corner board 100, the greater the length L1. For example, when the corner board 100 has a length of about 24 in. (60 cm) to 36 in. (90 cm), the thickness may be from about 0.12 in. (0.3 cm) to about 0.2 in. (0.5 cm). When the corner board 100 has a length of about 36 in. (90 cm) to 48 in. (120 cm), the thickness may be from about 0.16 in. (0.4 cm) to about 0.25 in. (0.625 cm). Furthermore, when the corner board 100 has a length of about 48 in. (120 cm) to 72 in. (180 cm), the thickness may be from about 0.25 in. (0.625 cm) to about 0.5 in (1.25 cm).

Referring to FIG. 2, a width W1 of the sides 101, 102 of the corner board 200 may be any width suitable for protecting the edge of a container and/or group of containers, and facilitating support for a stack of containers. In preferred embodiments, the width W1 of each side 101, 102 of the corner board 100 is about 1 in. (2.5 cm) to about 4 in. (10 cm). However, it should be readily understood that the width W1 of the sides 101, 102 of the corner board 100 can be any value in the range, or more or less than such a range.

The slit 110 as shown on the corner board 100 in FIG. 1A may be located at any suitable and/or a predetermined distance from the end (e.g., a first end) of the corner board 100, while still allowing the corner board 100 to rest on the container (as subsequently shown in FIG. 4). Also, the longer the corner board 100, the greater the distance of the slit 110 from the end of the corner board 100. Similarly, the thicker the corner board, the greater the distance of the slit 110 from the end of the corner board 100. For example, when the corner board 100 has a length of about 24 in. (60 cm) to 48 in. (120 cm), the distance may be from about 0.12 in. (0.3 cm) to about 0.375 in. (0.95 cm). When the corner board 100 has a length of about 48 in. (120 cm) to 60 in. (150 cm), the distance may be from about 0.375 in. (0.95 cm) to about 0.5 in (1.25 cm).

The notch 120 may comprise the material and/or a portion of the corner board 100 between the slit 110 and the end of the corner board 100. As shown in FIG. 2, the notch 120 may have an angle opposite to the angle α of the corner board 100. Generally, the notch extends inward from the bend, the bend has an angle α of less than 180°, and the notch has an angle of less than 180° facing the angle α of the bend of the corner board 100. In one example, the bend may have an angle α of about 90°, and the notch has an angle of about 90° facing the angle of the bend. However, due to variations in board quality and the meeting process, the notch may have an angle of from about 60° to about 120° facing the angle of the bend (typically between 90° and) 105°. In another embodiment, if the corner board 100 is made from a molded material, such as plastic, the notch 120 may run generally straight across between the two end points of the slit 110 (e.g., the notch has an angle of 0°). An opening 111 is formed between the slit 100 and the end of the corner board 100, as shown in FIG. 2. The opening 111 may have, but is not limited to, a diamond shaped opening, an A-shaped opening, or other various opening shapes, depending on the shape and/or size of the corner board, the slit in the corner board, the containers, and/or the stack of containers. Alternatively, the notch 120 may take on any form of a hanging notch or a notch that has the capability and adjustability to hang on the end of the corner board 100.

Figure 3:
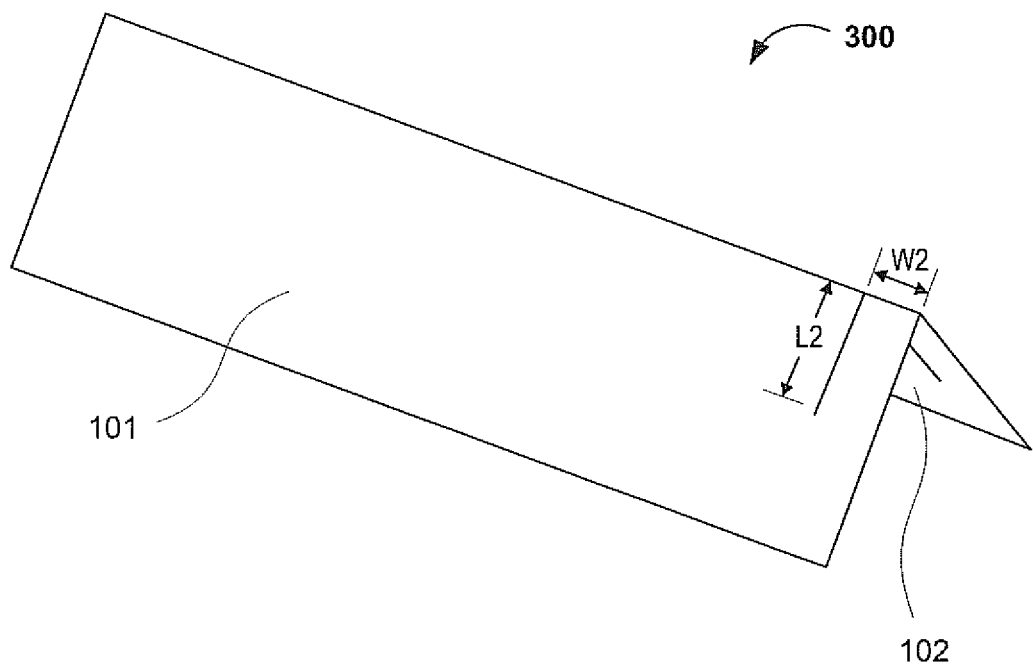
FIG. 3 is a side view of an exemplary "pre-notched" corner board according to another embodiment of the present invention.

Referring to FIG. 3, a distance (W2) from the end of the corner board 300 to the slit 110 of FIG. 1 may vary, depending on the type and/or thickness of material used to create the corner board 100. For example, a width W2 of the notch 120 of FIG. 1 may be from about 0.12 in. to about 1 in. (e.g., about 0.3 cm to about 2.5 cm). In one embodiment, the predetermined distance (W2) from the slit 110 to the end of the corner board is about 0.37 in. (e.g., about 1 cm) when the corner board 100 has a thickness of about 0.16 in. (e.g., 0.6 cm) or greater. In various embodiments, the predetermined distance (W2) from the slit 110 to the end of the corner board may be about 0.5 cm to about 2 cm. However, one skilled in the art will readily understand that the distance can be any suitable distance that achieves the objectives of the present invention. In further embodiments, when the corner board 100 is less than 0.16 in. (e.g. 0.6 cm), the slit 110 may be 0.63 in. (e.g. about 1.5 cm) from the end of the corner board 100. In further embodiments, the predetermined distance (W2) from the slit 110 to the end of the corner board may be about 0.75 cm to about 3 cm when the corner board has a thickness of less than 0.6 cm.

The length and/or depth (L2) of the slit 110 may be any suitable value that provides for a suitable notch 120 and/or provides for the corner board 100 to rest on one or more containers. Generally, the depth (L2) of the slit 110 is a predetermined percentage of the width W1 of each side 101, 102 of the corner board 100. For example, depth (L2) of the slit 110 may be from 20-80% of the width W1 (see FIG. 2) of each side of the corner board 100, or any value or range of values therein (e.g., 30-60%, about 50%, etc.), preferably 30-50% of the width of each of the first and second sides 101, 102. Typically, first and second sides 101, 102 have identical widths.

Furthermore, the angle of the corner board 100 and the angle of the notch 120 may depend on the shape of the container and/or stack of containers. Generally, the angle of the notch 120 can be any value that provides or allows for the corner board 100 to rest on and/or against the corner of a container, in which the angle of the notch 120 should be proportional to the angle of a commercially available container(s). However, an angle α of about 90 degrees is generally preferred.

An Exemplary Stack of Containers Protected with Corner Boards

Figure 4:
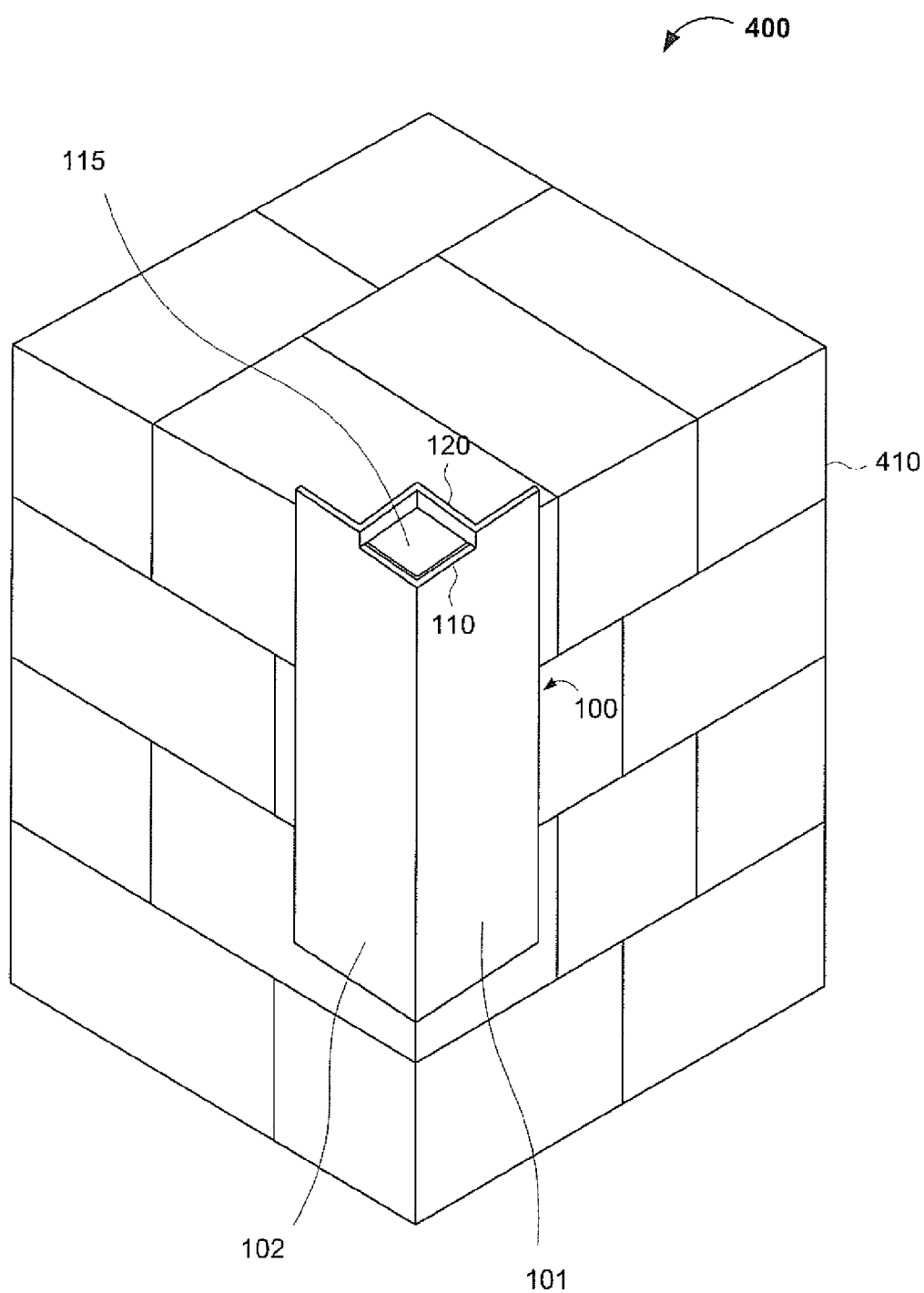
FIG. 4 is a perspective view of an exemplary corner board on a container stack.

FIG. 4 shows an exemplary use of the corner board 100 on a group of containers 410, in which the corner board 100 rests on the vertical edge of the group of containers 410. Alternatively, the corner board 100 may rest on the edge or corner of one or more items and/or objects (e.g., a stack or arrangement of items or objects, such as furniture), instead of the group of containers 410. To properly secure the stacked containers, the notch 120 of the corner board 100 is placed on an uppermost corner 115 of a stack of containers 410 such that the surface of the uppermost corner or edge 115 of the stack of containers 410 is exposed through the opening 111 (see FIG. 2) of the corner board 100. The sides 101, 102 of the corner board 100 rest on the sides of the stack of containers 410 adjacent to the edge of the stack of containers 410.

It will be readily understood by those skilled in the art that the corner board 100 can extend any suitable length along the edge of the group of containers 410. While the sides 101, 102 of the corner board 100 will generally be a length equal to or less than the length of the edge of the group of containers 410, it should be understood that the corner board 100 may be longer than the length of the edge of a single container and/or the group of containers 410. For instance, the corner board may have a length longer than the length of the vertical edge of a single container to protect the containers whose edges are generally vertically aligned with the container on which the corner board 100 is placed. In this manner, corner boards 100 may be placed on one or more containers (e.g., at each edge or at a subset of the edges) in a group of containers to mitigate damage to the edges of the containers in the group. The corner board 100 can also be useful for protecting other items or objects (e.g., furniture, bathroom/kitchen fixtures, windows, stacked building materials such as wood/boards, bricks, sheet rock, etc.).

The method may further comprise wrapping or banding the group of containers 410, or other stacked or grouped items and/or objects, together with the corner board(s) 100 in place with a wrapping, roping, or banding material. Wrapping, roping, or banding the group of containers generally improves the stability, handling, protection, and/or tamper resistance of the group of containers 410. It will be readily understood by those skilled in the art that the method may use any wrap, rope, band or strap suitable for use on the containers, items and/or objects to which it is applied. For instance, the wrap may comprise a stretch film, lay-flat film, roping film and/or strapping film, any of which may be solid or vented. Further still, the wrap, rope, and/or band may comprise shrink wrap, stretch film, roll(s) of stretch film on a spool, tape, one or more straps, one or more bands, net, rope, string, tarp, or any other suitable wrap (or combination of wraps and/or bands) for a group of (stacked) containers. Further still, the wrap, rope, or band may envelop any and/or every portion of the group of containers 410.

An Exemplary Apparatus for Manufacturing Slit or Notched Corner Boards

Figure 5A:
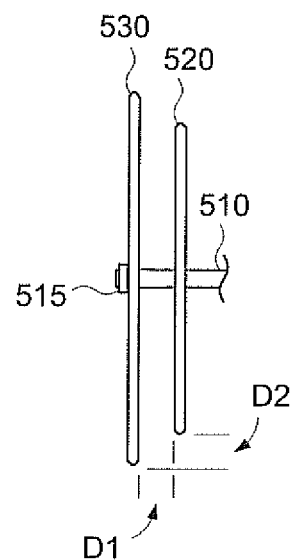
FIGS. 5A-5C are structural diagrams of an exemplary apparatus and/or exemplary parts of an apparatus for manufacturing the corner board of FIG. 3, in accordance with the present invention.
Figure 5B:
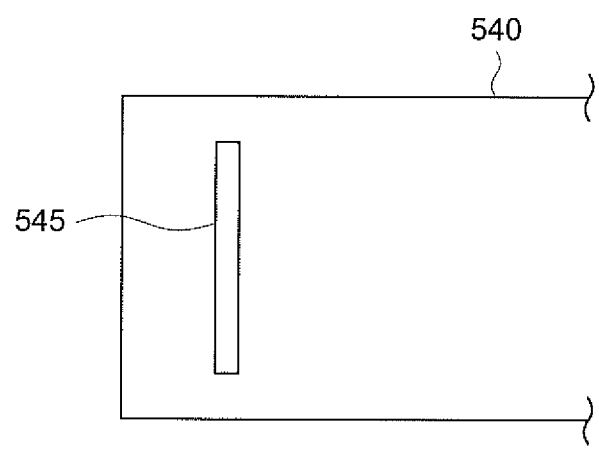
Figure 5C:
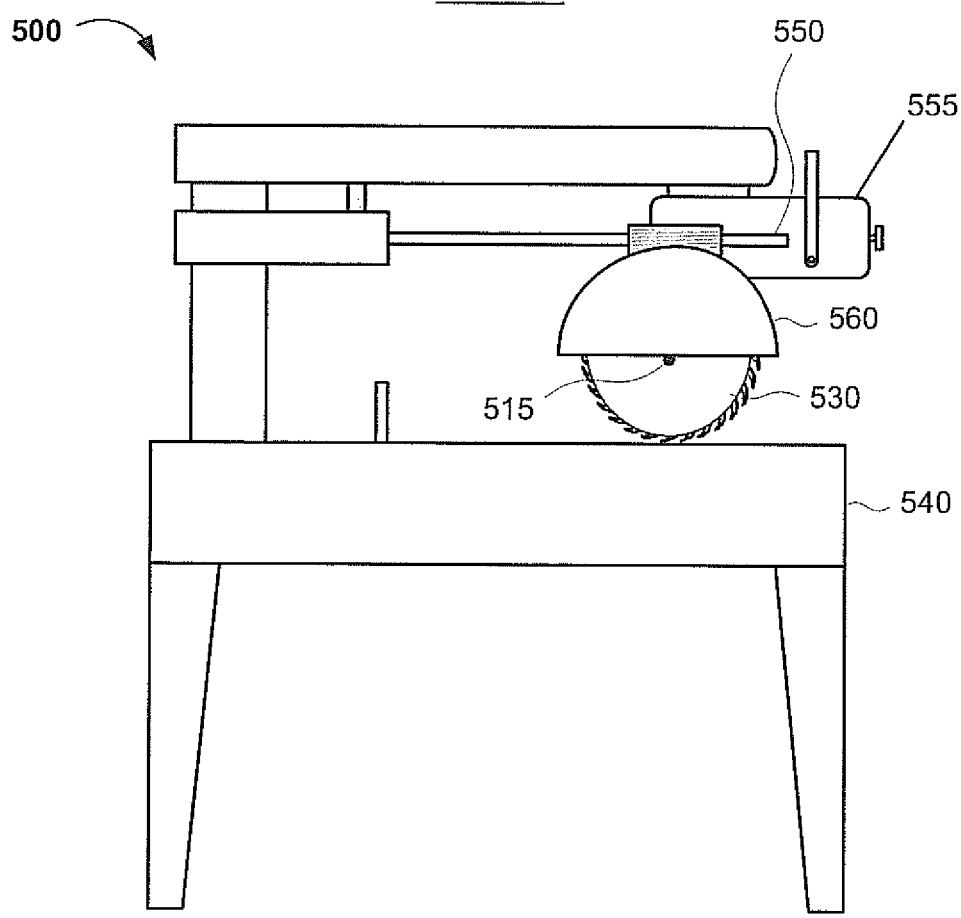

FIGS. 5A-5B are structural diagrams showing parts of equipment 500 for manufacturing the corner board of FIG. 3. FIG. 5C is an apparatus 500 for manufacturing either the corner board of FIG. 1 or the corner board of FIG. 3.

FIG. 5A shows a side view of a first cutting device 530 and a second cutting device 520, both attached to a center shaft 510 and secured by bolt 515. In various embodiments, the board stock is cut and the slit is formed simultaneously using a "dual purpose" cutting tool as shown in FIG. 5A. For example, the first cutting device 530 may be configured to cut board stock for the corner boards into individual sections. The first cutting device 530 may be, for example, a saw blade. The second cutting device 520 is configured to form a slit in the corner board near or adjacent to the cut end of the corner board 100. The second cutting device 520 may be selected from the group consisting of a knife blade, a laser, a saw blade, and a water jet.

Generally, the second cutting device 520 is offset and/or spaced apart from the first cutting device 530 by a predetermined distance D1, and an edge or cutting surface of the second cutting device 520 is raised by a predetermined distance D2 relative to an edge or cutting surface of the first cutting device 530. Distance D1 is generally equal to the width of the notch (e.g., the width W2 in FIG. 2 of the notch 120 of FIG. 1, from about 0.12 in. to about 1 in. [about 0.3 cm to about 2.5 cm]). In some embodiments, the distance D1 from the slit 110 to the end of the corner board may be about 0.5 cm to about 2 cm. For example, the distance from the slit 110 to the end of the corner board (which may be predetermined) is about 0.37 in. (e.g., about 1 cm) when the corner board 100 has a thickness of about 0.16 in. (e.g., 0.6 cm) or greater. However, one skilled in the art will readily understand that the distance D1 can be any suitable distance that achieves the objectives of the present invention. The distance D2 is generally calculated according to the formula $[W1-L2]\sin\theta$, where $\theta=[180°-\alpha]/2$, and W1, L2 and $\alpha$ are as described herein (e.g., W1 is the width of a side of the corner board, L2 is the length or depth of the slit into each side of the corner board, and $\alpha$ is the angle of the bend in the corner board).

FIG. 5B shows a top down view of a table top 540 with a cutout 545 therein. The table top 540 is the surface along which one or more corner board stock pieces are fed (e.g., along a direction substantially perpendicular to the cutout 545), and the cutout 545 is an area where the first cutting device 530 (e.g., a radial saw blade) moves laterally during the process of cutting the corner board 100. Generally, the width of the table top 540 depends on the number of pieces of corner board stock being fed and cut. Typically, when one piece (or length) of corner board stock is fed and cut, the table top 540 is about 2 ft. to about 4 ft. wide. When two pieces (or lengths) of corner board stock are cut, the width of the table top 540 is generally about 2.5 ft. to about 5 ft. Furthermore, the length of the table top should be sufficient to enable a radial saw or other cutting apparatus to cut the fed corner board stock (e.g., about 3 ft. to 6 ft. or more). Typically, the width of the cutout 545 may be about 0.5 in. to about 2 in. The length and width of the cutout 545 is sufficient for the blade(s) of the cutting apparatus to cut the corner board and clear the corner board on both sides. Generally, the length of the cutout 545 may be about 8 in. to about 24 in. (e.g., about 12 in. to about 16 in.), and the width of the cutout 545 may be about 0.5 in. to about 4 in. (e.g., about 1 in. to about 2 in).

FIG. 5C shows a front view of a cutting apparatus 500 for making slit and/or notched corner boards. The apparatus 500 includes an outer radial saw blade 530 (i.e., the first cutting device) with a saw blade cover 560 attached to support (e.g., a radial arm) 550. The first cutting device 530 and the second cutting device 520 (not visible in FIG. 5C) may be attached to a shaft, rod or other device defining a radial axis (e.g., shaft 510, FIG. 5A) that is driven or rotated by a motor in housing 555. The support 550 is generally configured to allow the first cutting device 530 and second cutting device 520 to move laterally across the corner board. As shown in FIGS. 5A and 5C, the cut across the corner board and the slit into the corner board may be made simultaneously. In one embodiment, when a first corner board is cut into a section (e.g., a free-standing corner board), a slit is formed in the next corner board. In a further embodiment, the cuts and slits are made automatically via computer controlled movement of the radial arm saw across the corner board stock at predetermined intervals, as the corner board stock is fed along the table top 540 at a predetermined rate (e.g., 1-10 ft/s, or any rate or range of rates therein).

Figure 5D:
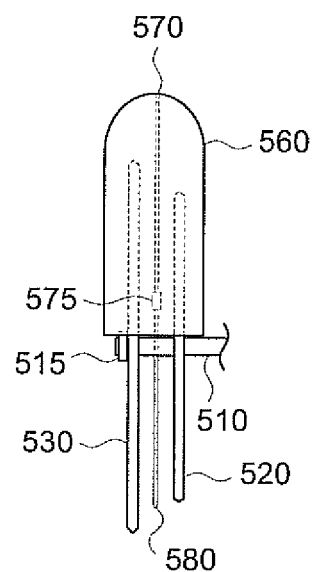
FIG. 5D is a structural diagram of an exemplary apparatus or apparatus part for manufacturing the corner board of FIG. 1, in accordance with the present invention.

FIG. 5D shows a side view of the dual purpose cutting apparatus with an attachment 580 for simultaneously extending the notch (e.g., notch 120 in FIG. 1) inwardly while cutting the corner board stock and forming the slit (e.g., slit 110 of FIG. 1). For example, a metal attachment 580 may be attached to the support 570 and/or saw cover 560, in a position between cutting devices 530 and 520 configured to form the notch 120 of FIG. 1 simultaneously with or immediately after the first cutting device 530 cuts the board stock and the second cutting device 520 forms the slit. Typically, the metal attachment 580 extends between the end of the second cutting device 520 and the first cutting device 530, ending at a rounded tip, the end of which is typically vertically closer to the edge or end of the second cutting device 520 than to the end or edge of first cutting device 530. As the first cutting device 530 cuts the leading corner board into a free-standing section and the second cutting device 520 forms the slit, the metal attachment 580 hits the edge of the corner board with sufficient force to invert the position and/or angle of the material at the end of the corner board between the slit and the cut end, thereby forming the notch. In one embodiment, the metal attachment 580 may comprise a roller (not shown) at the rounded end. In one embodiment, feature 575 depicts a metal cross-brace mounted or affixed to the cover 560, extending into and out from the plane of the page, which stabilizes the attachment 580 against the impact from the edge of the corner board.

In an alternative embodiment, feature 575 is an attachment mechanism that allows various attachments to be attached to the cover 560. Such attachments can comprise an air ram, air jet, air press, punch or other thrusting device, etc. Generally, such attachments do not extend past the outer edge of the second cutting device 520. Thus, the inwardly extending material (e.g., the notch 120) may be created using equipment that does not come into direct contact with the corner board, which may improve the run time of the equipment between maintenance or repair procedures.

An Exemplary Method of Manufacturing Slit and/or Notched Corner Boards

Another aspect of the present invention relates to a method of manufacturing slit and/or notched corner boards. An exemplary method of manufacturing such corner boards (e.g., the corner boards of FIGS. 1 and 3) is described below.

In one embodiment, the method of manufacturing a corner board comprises bending a board stock to form first and second sides of the corner board, cutting the board stock into fixed lengths, and forming a slit near or adjacent to a first end of the corner board. The first and second sides of the corner board have an angle therebetween. Also, the bent and cut board stock forms the corner board. In a further embodiment of the method, a notch is formed near or adjacent to the first end of the corner board.

FIG. 6 shows a flow chart 600 of an exemplary method of manufacturing a notched corner board (e.g., corner board 100 of FIG. 1). The method of manufacturing a slit corner board generally comprises forming a slit 110 near one end of the corner board 100, and the method of forming a notched corner board generally further comprises forming a notch 120 at the end of the corner board 100 from the material between the slit 110 and the end of the corner board.

Referring back to FIG. 6, the method starts at 610, and at 620, board stock is laminated with one or more layers of paper and/or plastic. The board stock may comprise a pre-laminated corner board stock, comprising a plurality of layers of paper, and optionally one or more layers of plastic, adhesively laminated to one or two adjacent layers of paper and/or (when present) plastic. In various embodiments, the blank (e.g., board stock cut or formed to a predetermined width) may comprise alternating layers of paper or other feed stock and adhesive, folded to the desired angle $\alpha$.

In further embodiments, the corner board comprises layers of paper and/or other feed stock with uncured (i.e., wet or damp) adhesive between the layers. In such embodiments, the method may further comprise drying the corner board. For instance, if the material is a multi-ply paperboard, pressboard, or cardboard, the curing time will provide time for the adhesive (e.g., glue) between the layers to cure or dry. Providing a suitable curing period may allow for easier manipulation of the corner board during its manufacture as well as providing increased strength and/or durability of the corner board during use. In some embodiments, the curing period may depend on the time of year. For instance, during winter months when the temperatures are cooler, it may take 10-14 days for the corner boards to cure, whereas it may take about 3-4 days during the warmer summer months.

At 630, a corner board 100 is formed by bending the board stock at an angle $\alpha$, forming first and second sides (see, e.g., sides 101, 102 of FIG. 1) of the corner board 100. Alternatively, a preformed corner board having two sides 101, 102 at an angle $\alpha$ running the length of the corner board material may be used. Generally, the corner board has an angle $\alpha$ of about 90°.

At 640, the corner board 100 is cut into fixed-length pieces. The fixed-length pieces may have a predetermined length (e.g., L1 in FIG. 1) of about 24 in. (60 cm) to about 90 in. (230 cm). However, it should be readily understood that the predetermined length (e.g., L1 in FIG. 1) of the sides (e.g., 101, 102 in FIG. 1) of the corner board 100 can be any value in the range, or more or less than such a range.

At 650, the slits 110 are cut at a predetermined distance (e.g., width W2 in FIG. 3) from the end of the corner board 100. Each slit 110 is generally cut into each side (101, 102 in FIG. 1) of the corner board 100 to a predetermined depth (e.g., length L2 in FIG. 3) from the point of origin of the angle $\alpha$. The distance W2 may be about 0.3 cm to about 3 cm. Simultaneous formation of slits 110 and cuts of the corner board may be performed as discussed above. In one embodiment, a first corner board is cut into a section and a slit is formed in the next corner board simultaneously. In a further embodiment, the cuts are made and the slits are formed automatically via computer controlled movement of a "dual purpose" cutting apparatus across the corner board stock, at predetermined intervals as the corner board stock is fed into the apparatus (e.g., 500 in FIG. 5C) at a predetermined rate (e.g., 1-10 ft/s).

The corner board 100 and the slit 110 may be cut using any capable cutting tool, such as a knife blade, laser, or saw, including a radial saw. In one embodiment, the tool for cutting the corner board and forming the slit includes two substantially side-by-side cutting devices. In such an example, the beam and/or blade(s) that cut the corner board and form the slit are offset from each other (e.g., spaced apart by distance W2), with the edge of the blade, beam, or other slit-forming tool that cuts the slit raised by distance $[W1-L2] \sin \theta$, where $\theta=[180°-\alpha]/2$ (and W1, L2 and $\alpha$ are as described herein).

At 660, a determination is made whether to form a notch or not. If a notch is formed, then at 670, the notch (e.g., notch 120 of FIG. 1) is formed at, near, or adjacent to the end of the board 100 by pushing or otherwise forcing the material of the bent board stock between the slit 110 and the cut end of the corner board 100 inward from the angle and/or edge of the corner board. For example, the bent board stock between the slit 110 (FIG. 1) and the end of the corner board 100 is pushed inward from the angle $\alpha$. Generally, forming the notch also forms an opening 111 between the slit 110 and the first end of the corner board 100, as described above. Thus, forming the notch 120 at 670 in FIG. 6 also forms an opening 111 in the corner board between the slit 110 and the end of the corner board. After the notch is formed, or if a notch is not being formed, then the method ends at 680.

CONCLUSION/SUMMARY

Embodiments of the present invention can advantageously provide a corner board that may be rested or placed along a vertical edge of a container or stack of containers, without the need for additional materials or steps (e.g., staples or tape) to affix the corner board to the container or stack of containers. Thus, the present corner board advantageously holds the container stacks in place when the stack is wrapped with appropriate wrapping material, and eliminates and/or minimizes the need for additional material, the risk of injury to the user and/or damage to the containers or materials therein, and cost and expenses associated therewith.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching(s). The embodiments were chosen and described in order to best explain the principles of the invention and its practical application(s), to thereby enable others skilled in the art to best utilize the invention and various embodiments with various modifications as are suited to the particular use contemplated. It is intended that the scope of the invention be defined by the claims appended hereto and their equivalents.

What is claimed is:

1. A corner board, comprising:
   first and second sides, each comprising a board material;
   a bend between the first and second sides, joining first and second sides together; and
   a slit in the corner board at a predetermined distance from the first end of the corner board, wherein the predetermined distance is between about 0.5 cm and about 2 cm, inclusive, when the corner board has a thickness of about 0.6 cm or greater, and between about 0.75 cm to about 3 cm, inclusive, when the corner board has a thickness of less than 0.6 cm, the slit completely crossing the bend and partially crossing the first and second sides.

2. The corner board of claim 1, wherein the board material comprises paper, cardboard, pressed and/or corrugated cardboard, fiberboard, paperboard, boxboard, containerboard, plastic, or any laminate or other combination thereof.

3. The corner board of claim 1, wherein each of the first and second sides has a thickness of about 0.2 cm to about 1.3 cm.

4. The corner board of claim 1, wherein each of the first and second sides has a length of about 20 cm to about 90 cm and a width of about 2.5 cm to about 10 cm.

5. The corner board of claim 1, wherein each of the first and second sides have an identical width, and the slit has a depth of about 20-50% of the width of each of the first and second sides.

6. The corner board of claim 1, further comprising a notch comprising a portion of the corner board between the slit and the first end of the corner board, the notch forming an opening along the slit and/or between the slit and the first end of the corner board.

7. The corner board of claim 6, wherein the notch extends inward from the bend.

8. The corner board of claim 7, wherein the bend has a first angle of about 90°, and the notch has a second angle of from about 60° to about 120° facing the first angle.

9. The corner board of claim 6, wherein the notch has a width of about 0.3 cm to 2.5 cm.

10. The corner board of claim 1, wherein each of the first and second sides has an inner thickness and an outer thickness, where the inner thickness is greater than the outer thickness.

11. The corner board of claim 1, wherein each of the first and second sides has an inner thickness and an outer thickness, where the outer thickness is greater than the inner thickness.

12. The corner board of claim 1, wherein the thickness is from 0.6 cm to 1.3 cm.

13. The corner board of claim 1, wherein the thickness is from 0.2 cm to 0.6 cm.

14. A method of securing a plurality of stacked containers, comprising:
    placing a notch of a corner board on an uppermost corner of a stack of containers, items, and/or objects, the corner board comprising:
      first and second sides, each comprising a board material;
      a bend between the first and second sides, joining first and second sides together;
      a slit adjacent to a first end of the corner board, the slit completely crossing the bend and partially crossing the first and second sides; and
      the notch, comprising a portion of the corner board between the slit and the first end of the corner board, the notch forming an opening along the slit and/or between the slit and the first end of the corner board; and
    wrapping or banding the stack of containers, items, and/or objects with a wrapping or banding material.

15. The method of claim 14, wherein the slit is between about 0.5 cm and about 2 cm, inclusive, from the first end of the corner board when the corner board has a thickness of about 0.6 cm or greater, and between about 0.75 cm and about 3 cm, inclusive, from the first end of the corner board when the corner board has a thickness of less than 0.6 cm.

16. The method of claim 14, wherein the board material comprises paper, cardboard, pressed and/or corrugated cardboard, fiberboard, paperboard, boxboard, containerboard, plastic, or any laminate or other combination thereof.

17. The method of claim 14, wherein each of the first and second sides has a thickness of about 0.2 cm to about 1.3 cm.

18. The method of claim 14, wherein each of the first and second sides has a length of about 20 cm to about 90 cm and a width of about 2.5 cm to about 10 cm.

19. The method of claim 14, wherein the notch extends inward from the bend.

20. The method of claim 19, wherein the bend has a first angle of about 90°, and the notch has a second angle of from about 60° to about 120° facing the first angle.

* * * * *